United States Patent
Oka

(10) Patent No.: US 10,873,087 B2
(45) Date of Patent: Dec. 22, 2020

(54) METAL NEGATIVE ELECTRODE SECONDARY BATTERY AND METHOD OF MANUFACTURING SAME

(71) Applicant: TOYOTA JIDOSHA KABUSHIKI KAISHA, Toyota (JP)

(72) Inventor: Hideaki Oka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/058,463

(22) Filed: Aug. 8, 2018

(65) Prior Publication Data

US 2019/0097212 A1    Mar. 28, 2019

(30) Foreign Application Priority Data

Sep. 27, 2017    (JP) ................. 2017-186948

(51) Int. Cl.
| | |
|---|---|
| H01M 4/62 | (2006.01) |
| H01M 4/1395 | (2010.01) |
| H01M 4/40 | (2006.01) |
| H01M 4/66 | (2006.01) |
| H01M 4/134 | (2010.01) |
| H01M 4/04 | (2006.01) |
| H01M 10/052 | (2010.01) |
| H01M 10/0585 | (2010.01) |
| H01M 4/36 | (2006.01) |
| H01M 4/02 | (2006.01) |

(52) U.S. Cl.
CPC .......... *H01M 4/625* (2013.01); *H01M 4/049* (2013.01); *H01M 4/0445* (2013.01); *H01M 4/0471* (2013.01); *H01M 4/134* (2013.01); *H01M 4/1395* (2013.01); *H01M 4/364* (2013.01); *H01M 4/366* (2013.01); *H01M 4/405* (2013.01); *H01M 4/663* (2013.01); *H01M 10/052* (2013.01); *H01M 10/0585* (2013.01); *H01M 2004/027* (2013.01)

(58) Field of Classification Search
CPC ....... H01M 4/134; H01M 4/625; H01M 4/663
USPC ...................................... 429/231.95
See application file for complete search history.

(56) References Cited

U.S. PATENT DOCUMENTS

| | | | |
|---|---|---|---|
| 2015/0155546 A1* | 6/2015 | Yushin ................ | H01M 4/1397 427/78 |
| 2016/0104882 A1* | 4/2016 | Yushin ................. | H01M 4/362 429/218.1 |

FOREIGN PATENT DOCUMENTS

| | | | |
|---|---|---|---|
| JP | H02-121258 A | | 5/1990 |
| JP | 03216960 A | * | 9/1991 |

(Continued)

OTHER PUBLICATIONS

Yan, K. et al., "Selective deposition and stable encapsulation of lithium through heterogeneous seeded growth," Nature Energy, Mar. 2016, vol. 1, pp. 1-8.

*Primary Examiner* — James M Erwin
(74) *Attorney, Agent, or Firm* — Oliff PLC

(57) ABSTRACT

A metal negative electrode secondary battery at least includes a positive electrode, a negative electrode, and an electrolyte. The negative electrode at least includes a support and a first metal. The support at least includes a carbon particle. The carbon particle is provided with a plurality of open pores. The first metal is held in the open pores. The first metal is an alkali metal or an alkaline earth metal. The negative electrode is configured to exchange an electron through dissolution reaction and deposition reaction of the first metal.

5 Claims, 4 Drawing Sheets

(56) References Cited

FOREIGN PATENT DOCUMENTS

| JP | H04-39864 A | 2/1992 |
| JP | H04-141953 A | 5/1992 |
| JP | H07-326342 A | 12/1995 |
| JP | H11-120992 A | 4/1999 |
| JP | 2003-249210 A | 9/2003 |
| JP | 2012-209217 A | 10/2012 |

* cited by examiner

METAL NEGATIVE ELECTRODE SECONDARY BATTERY AND METHOD OF MANUFACTURING SAME

This nonprovisional application is based on Japanese Patent Application No. 2017-186948 filed on Sep. 27, 2017, with the Japan Patent Office, the entire contents of which are hereby incorporated by reference.

BACKGROUND

Field

The present disclosure relates to a metal negative electrode secondary battery and a method of manufacturing the metal negative electrode secondary battery.

Description of the Background Art

A metal negative electrode secondary battery including a lithium metal or the like as a negative electrode active material has been examined.

SUMMARY

A lithium ion secondary battery and a sodium ion secondary battery have been developed. In each of these secondary batteries, a negative electrode includes graphite and a graphite intercalation compound such as hard carbon. A lithium (Li) ion or the like, which serves as a charge carrier, reacts with the graphite intercalation compound at a potential higher than a deposition potential thereof. Accordingly, electrons are exchanged. In other words, each of the lithium ion secondary battery and the like is used in a potential range in which the charge carrier is not deposited as a metal.

On the other hand, in a metal negative electrode secondary battery, electrons are exchanged through dissolution reaction and deposition reaction of a Li metal or the like, for example. It is expected that the metal negative electrode secondary battery has a large charging and discharging capacity. However, the metal negative electrode secondary battery has a challenge in terms of charging and discharging reversibility. Specifically, due to repeated deposition and dissolution of the metal, it is very difficult to control a form of deposition of the metal. For example, it is known that the Li metal or the like is deposited to have a dendrite structure (tree-like structure). Due to the deposition of the metal with such a dendrite structure, the charging and discharging reversibility is decreased significantly. Since the metal with the dendrite structure is active, it is considered that a side reaction between the metal with the dendrite structure and an electrolyte occurs to result in deactivation of the metal, i.e., the negative electrode active material.

According to a report by Kai et al., (Kai Yan et al., "Selective deposition and stable encapsulation of lithium through heterogeneous seeded growth", Nature Energy, 2016, Vol. 1, Article number 16010), gold (Au) nano particles are interspersed in an inner wall of a hollow carbon particle (capsule) and therefore the Li metal is stably dissolved and deposited repeatedly within the capsule. Kai et al., explains that the occurrence of side reaction between the Li metal and the electrolyte is suppressed because the capsule decreases direct contact between the Li metal and the electrolyte.

However, it is considered that in the capsule of Kai et al., a path for diffusing metal ions into the hollow inside the particle is limited. Accordingly, depending on a current density, it is considered difficult to diffuse metal ions into the hollow inside the particle and deposit them in this hollow. That is, the charging and discharging reversibility may be decreased.

An object of the present disclosure is to improve charging and discharging reversibility in a metal negative electrode secondary battery.

Hereinafter, the technical configuration, function and effect of the present disclosure will be described. However, the mechanism of the function of the present disclosure includes a presumption. The scope of claims should not be limited depending on whether the mechanism of the function is correct or incorrect.

[1] A metal negative electrode secondary battery at least includes a positive electrode, a negative electrode, and an electrolyte. The negative electrode at least includes a support and a first metal. The support at least includes a carbon particle. The carbon particle is provided with a plurality of open pores. The first metal is held in the open pores. The first metal is an alkali metal or an alkaline earth metal. The negative electrode is configured to exchange an electron through dissolution reaction and deposition reaction of the first metal.

In the metal negative electrode secondary battery of the present disclosure, the dissolution reaction and deposition reaction of the first metal (negative electrode active material) are performed in the specific support. The support is a porous carbon material. That is, the support includes the carbon particle. The carbon particles is provided with the plurality of open pores. The term "open pore" refers to a pore that is connected to outside of the particle. It is expected that the ions of the first metal are diffused from the plurality of open pores into inside of the carbon particle.

The dissolution reaction and deposition reaction of the first metal in the open pores can be repeated stably. That is, the charging and discharging reversibility is expected to be improved. It is considered that since the metal is deposited in a narrow pore space, nucleation of the first metal is likely to occur uniformly and a form of deposition of the first metal is also likely to be uniform.

[2] The support may further include a second metal. The second metal is a metal to be alloyed with the first metal. The second metal is adhered to inner walls of the open pores.

Since the support further includes the second metal, the charging and discharging reversibility is expected to be improved. It is expected that the second metal adhered to the inner walls of the open pores serves as a seed of the nucleation of the first metal. It is expected that the nucleation of the first metal selectively occurs within the open pores since the nucleation of the first metal occurs with the second metal serving as a seed. Further, since the second metal is a metal to be alloyed with the first metal (negative electrode active material), it is expected that nucleation overpotential is decreased when the first metal is deposited. With synergy of these functions, it is considered that the charging and discharging reversibility is improved.

[3] The first metal may be lithium and the second metal may be magnesium.

It is expected that the nucleation of Li occurs uniformly in the open pore of the support. This is presumably because the Li ions can react with the pore wall (carbon). Furthermore, magnesium (Mg) can be partially alloyed with Li. In the combination of Li and Mg, it is expected to greatly decrease the nucleation overpotential of Li. With synergy of these functions, it is expected to promote uniform nucleation of Li.

[4] The support may further include an ion-conductive polymer. The ion-conductive polymer coats an outer surface of the carbon particle.

Since the ion-conductive polymer coats the outer surface of the carbon particle, it is expected that the charging and discharging reversibility is improved. This is presumably because the nucleation of the first metal is suppressed at the outer surface of the carbon particle. That is, this is presumably because the nucleation of the first metal occurs more selectively in the open pore.

[5] According to a method of manufacturing a metal negative electrode secondary battery, there is manufactured a metal negative electrode secondary battery at least including a positive electrode, a negative electrode, and an electrolyte, the negative electrode being configured to exchange an electron through dissolution reaction and deposition reaction of a first metal.

The manufacturing method at least includes the following (A) to (D).

(A) A support is prepared.

(B) The negative electrode at least including the support is prepared.

(C) The metal negative electrode secondary battery at least including the positive electrode, the negative electrode, and the electrolyte is assembled.

(D) The metal negative electrode secondary battery is charged.

The support at least includes a carbon particle. The carbon particle is provided with a plurality of open pores. The first metal is an alkali metal or an alkaline earth metal. The first metal is held in the open pores by charging the metal negative electrode secondary battery.

According to this manufacturing method, the metal negative electrode secondary battery having the configuration of [1] above can be manufactured.

[6] The method of manufacturing the metal negative electrode secondary battery may further include the following (a1), (a2), (a5) and (a6).

(a1) A mixture is produced by mixing a resin material and metal oxide particles.

(a2) The carbon particle in which the plurality of metal oxide particles are dispersed is produced by heating the mixture in a non-oxidizing atmosphere.

(a5) The plurality of open pores are formed in the carbon particle by removing part of the metal oxide particles from the carbon particle.

(a6) A second metal is generated by reducing the metal oxide particles remaining in the open pores. The second metal is a metal to be alloyed with the first metal.

According to this manufacturing method, the metal negative electrode secondary battery having the configuration of [2] above can be manufactured.

[7] In the method of manufacturing the metal negative electrode secondary battery, the first metal may be lithium and the second metal may be magnesium. According to this manufacturing method, the metal negative electrode secondary battery having the configuration of [3] above can be manufactured.

[8] The method of manufacturing the metal negative electrode secondary battery may further include the following (a3) and (a4).

(a3) A fluid dispersion is produced by dispersing the carbon particle in a solution of an ion-conductive polymer.

(a4) The carbon particle having an outer surface coated with the ion-conductive polymer is produced by filtering the fluid dispersion.

According to this manufacturing method, the metal negative electrode secondary battery having the configuration of [4] above can be manufactured.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (also referred to as "the present embodiment" in the present specification) of the present disclosure will be described. However, the description below is not intended to limit the scope of claims. In the description below, the metal negative electrode secondary battery may be simply described as "battery".

<Metal Negative Electrode Secondary Battery>

Figure 1:
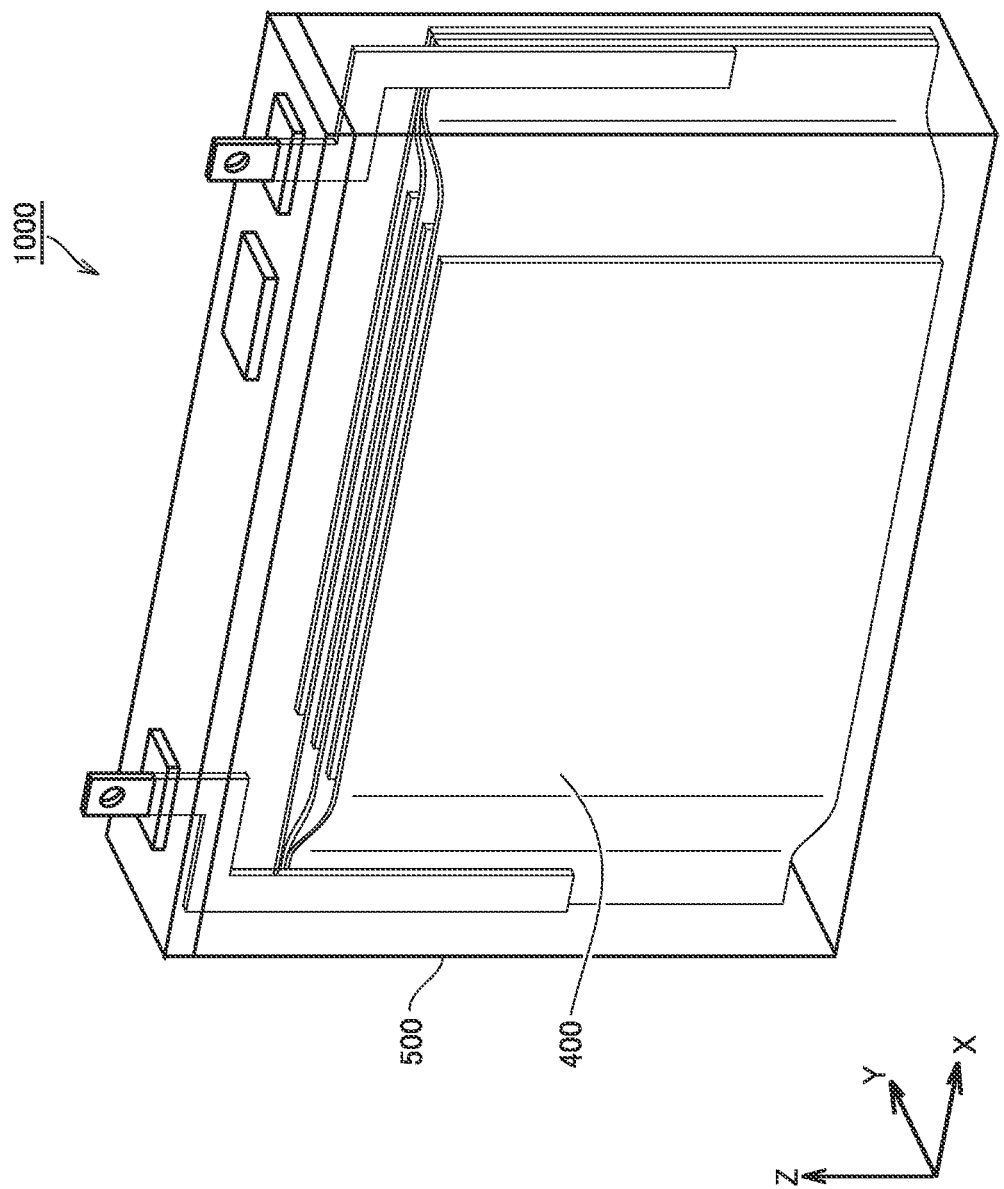
FIG. 1 is a schematic view showing an exemplary configuration of a metal negative electrode secondary battery in the present embodiment.

FIG. 1 is a schematic view showing an exemplary configuration of a metal negative electrode secondary battery in the present embodiment.

A battery 1000 includes a case 500. Case 500 is sealed. Case 500 is composed of an aluminum (Al) alloy, for example. Case 500 stores an electrode group 400 and an electrolyte. Case 500 has a prismatic shape (flat profile rectangular parallelepiped). However, the case of the present embodiment should not be limited to the prismatic shape. The case may have a cylindrical shape, for example. The case may be a pouch composed of an Al laminate film or the like, for example. That is, the battery of the present embodiment may be a laminate type battery.

Figure 2:
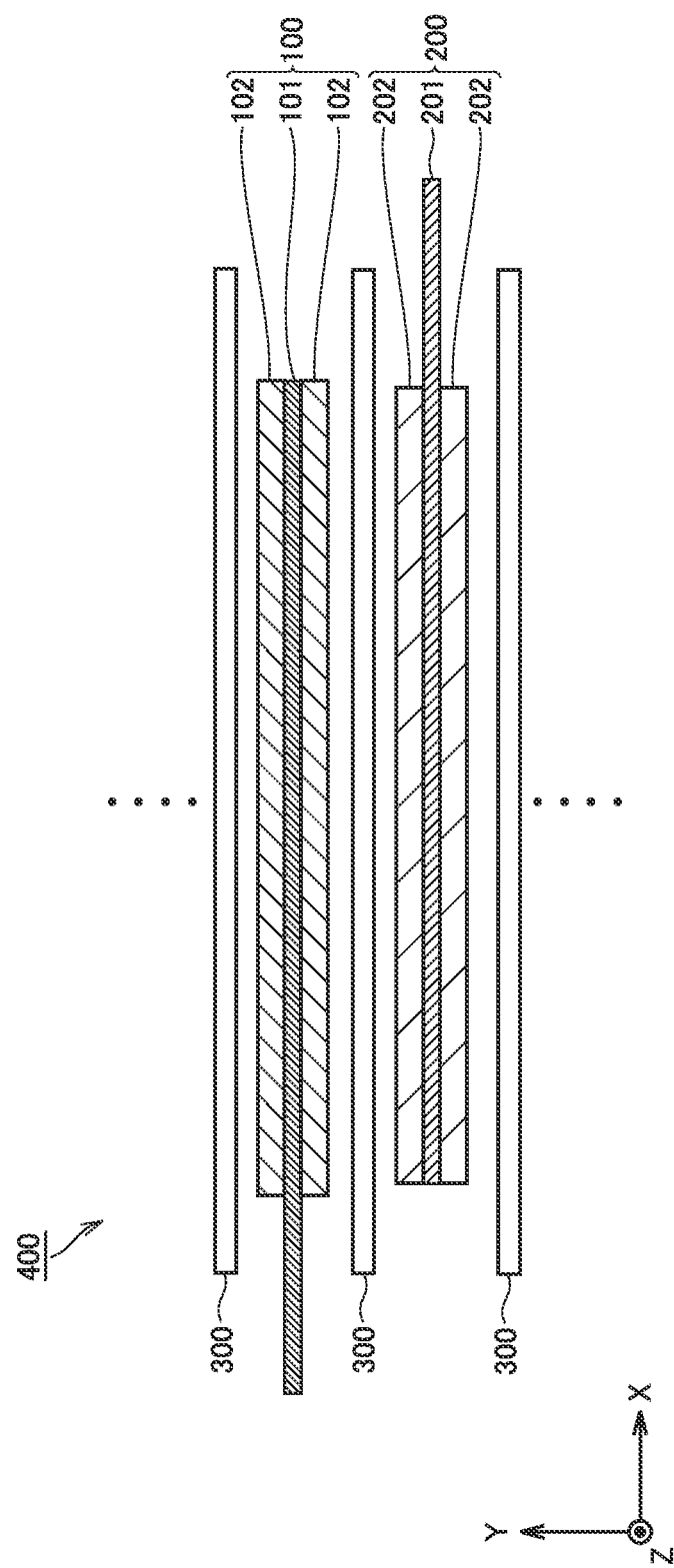
FIG. 2 is a conceptual cross sectional view showing an exemplary configuration of an electrode group in the present embodiment.

FIG. 2 is a conceptual cross sectional view showing an exemplary configuration of the electrode group in the present embodiment.

Electrode group 400 includes a positive electrode 100, a negative electrode 200, and a separator 300. Separator 300 is disposed between positive electrode 100 and negative electrode 200. The electrolyte exists in a space within electrode group 400. That is, battery 1000 at least includes positive electrode 100, negative electrode 200, and the electrolyte.

Electrode group 400 is a stack type electrode group. That is, electrode group 400 is formed by alternately stacking positive electrode 100 and negative electrode 200 with separator 300 being interposed between positive electrode 100 and negative electrode 200. However, the electrode group of the present embodiment may be a wound type electrode group. The wound type electrode group can be formed by layering the positive electrode, the separator, and the negative electrode in this order and winding them in the form of a spiral, for example.

<<Negative Electrode>>

Negative electrode 200 can be a sheet. Negative electrode 200 includes a negative electrode collector 201 and a support layer 202, for example. Negative electrode collector 201 may be a copper (Cu) foil, a Cu alloy foil, or the like, for example. Negative electrode collector 201 may have a thickness of more than or equal to 5 µm and less than or equal to 50 µm, for example. The thickness of each configuration in the present specification can be measured by a micrometer or the like, for example. The thickness thereof can be measured by way of a microscopic cross sectional image of each configuration or the like. The thickness can be measured at least at three locations. An arithmetic means of values measured at least at the three locations can be employed as a measurement result.

Support layer 202 is formed on a surface of negative electrode collector 201. Support layer 202 may be formed on each of the front and backside surfaces of negative electrode collector 201. Support layer 202 may have a thickness of more than or equal to 1 µm and less than or equal to 500 µm, for example. Support layer 202 may have a thickness of more than or equal to 10 µm and less than or equal to 200 µm, for example. Support layer 202 at least includes a support 10 and a first metal 21. That is, negative electrode 200 at least includes support 10 and first metal 21.

<<Support>>

Figure 3:
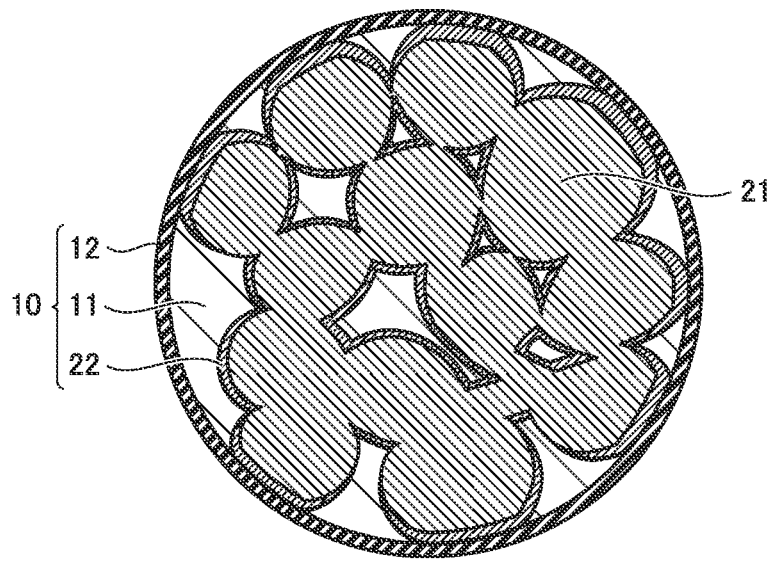
FIG. 3 is a conceptual cross sectional view showing a support in the present embodiment.

FIG. 3 is a conceptual cross sectional view showing the support in the present embodiment.

Support 10 at least includes carbon particle 11. Carbon particles 11 may have a d50 of more than or equal to 0.5 µm and less than or equal to 100 µm, for example. By a laser diffraction scattering method, "d50" in the present specification can be measured. In a volume-based integrated particle size distribution, 50% of particles have a particle size smaller than d50, and 50% of the particles have a particle size larger than d50. Carbon particles 11 may have a d50 of more than or equal to 1 µm, for example. Carbon particles 11 may have a d50 of more than or equal to 10 µm, for example. Carbon particles 11 may have a d50 of more than or equal to 20 µm, for example. Carbon particles 11 may have a d50 of less than or equal to 80 µm, for example.

The shape of carbon particle 11 should not be limited in particular. Carbon particle 11 may have a bulk shape, a spherical shape, a columnar shape, a cubic shape, or the like, for example.

Carbon particle 11 is porous. That is, carbon particle 11 is provided with a plurality of open pores. It can be confirmed through transmission electron microscope (TEM) observation that carbon particle 11 is provided with a plurality of open pores. When two or more openings are confirmed in the surface of carbon particle 11, it is regarded that carbon particle 11 is provided with a plurality of open pores. Carbon particle 11 may be provided with 10 or more openings, for example. Carbon particle 11 may be provided with 100 or more openings, for example.

Each of the open pores may be a macropore. The term "macropore" refers to a pore having a size of more than 50 nm. A "mean pore size" in the present specification can be calculated by analyzing, using a BJH (Barret-Joyner-Halenda) method, an adsorption/desorption isotherm obtained through nitrogen gas adsorption/desorption measurement. For the adsorption/desorption measurement, a general specific surface area measuring instrument may be used. The mean pore size is measured at least 3 times. An arithmetic means of values measured at least 3 times can be employed as a measurement result.

Carbon particles 11 may have a mean pore size of more than 50 nm and less than or equal to 500 nm, for example. Carbon particles 11 may have a mean pore size of more than or equal to 100 nm, for example. Carbon particles 11 may have a mean pore size of less than or equal to 300 nm, for example.

By analyzing the adsorption isotherm using the BJH method, a whole pore volume can also be calculated. The whole pore volume is measured at least 3 times. An arithmetic means of values measured at least 3 times can be employed as a measurement result. Carbon particle 11 may have a whole pore volume of more than or equal to 0.1 ml/g and less than or equal to 3 ml/g, for example. Carbon particle 11 may have a whole pore volume of more than or equal to 1 ml/g and less than or equal to 3 ml/g, for example.

Carbon particle 11 desirably has a small BET specific surface area. With such a small BET specific surface area of carbon particle 11, it is expected to suppress a side reaction such as reduction and decomposition of the electrolyte. Accordingly, it is expected to improve charging and discharging reversibility. The "BET specific surface area" in the present specification is calculated by analyzing, using a multipoint BET (Brenauer-Emmet-Telle) method, the adsorption/desorption isotherm obtained by the nitrogen gas adsorption/desorption measurement. For the adsorption/desorption measurement, a general specific surface area measuring instrument may be used. The BET specific surface area is measured at least 3 times. An arithmetic means of values measured at least 3 times can be employed as a measurement result.

Carbon particle 11 may have a BET specific surface area of less than or equal to 500 $m^2/g$, for example. Carbon particle 11 may have a BET specific surface area of more than or equal to 50 $m^2/g$ and less than or equal to 500 $m^2/g$, for example. Carbon particle 11 may have a BET specific surface area of less than or equal to 50 $m^2/g$, for example. Carbon particle 11 may have a BET specific surface area of more than or equal to 5 $m^2/g$, for example.

The pore wall (frame) of carbon particle 11 is made of carbon. Carbon particle 11 may have a three-dimensional mesh structure. That is, carbon particle 11 may have a sponge-like shape. The plurality of open pores may be connected to one another in the particle. That is, the plurality of open pores may form a communication hole. It is expected that the communication hole provided in carbon particle 11 facilitates diffusion of ions of first metal 21.

The pore wall may be carbonaceous. The pore wall may be graphitic. That is, carbon particle 11 may be partially graphitized. It is expected that when the first metal is Li, Li ions are occluded in the pore wall because the pore wall is graphitized. Accordingly, it is expected to improve the charging and discharging reversibility.

(First Metal)

First metal 21 is held in the open pores. First metal 21 is a negative electrode active material. First metal 21 is an alkali metal or an alkaline earth metal. The alkali metal may be lithium (Li), sodium (Na), or potassium (K), for example. The alkaline earth metal may be magnesium (Mg) or calcium (Ca), for example. That is, the first metal may be Li, Na, K, Mg, or Ca.

(Second Metal)

Support 10 may further include a second metal 22. Support 10 may include more than or equal to 0.01 mass % and less than or equal to 10 mass % of second metal 22, for example. Second metal 22 is adhered to the inner walls of the open pores. It is expected that second metal 22 serves as a nucleation seed of first metal 21. It is expected that nucleation of first metal 21 selectively occurs within the open pores since the nucleation of first metal 21 occurs with second metal 22 serving as a seed. That is, it is expected to improve the charging and discharging reversibility.

A form of second metal 22 should not be limited in particular. Second metal 22 may form a particle. Second metal 22 may form a film. That is, second metal 22 may coat the inner walls of the open pores. When second metal 22 forms a particle, this particle may have a nano-size particle size. That is, second metal 22 may be a nano particle. The nano particle may have a particle size of more than or equal to 1 nm and less than or equal to 200 nm, for example.

Second metal 22 is a metal to be alloyed with first metal 21. Accordingly, it is expected that nucleation overpotential of first metal 21 can be decreased. When first metal 21 is Li, second metal 22 may be Mg, Al, zinc (Zn), silver (Ag), platinum (Pt), Au, or the like, for example. One type of metal may be used as second metal 22. Two or more types of metals may be used as second metal 22. That is, first metal 21 may be Li and second metal 22 may be at least one selected from a group consisting of Mg, Al, Zn, Ag, Pt, and Au. First metal 21 may be Li and second metal 22 may be Mg. With this combination, it is expected to greatly decrease the nucleation overpotential.

(Ion-Conductive Polymer)

Support 10 may further include an ion-conductive polymer 12. Support 10 may include more than or equal to 1 mass % and less than or equal to 20 mass % of ion-conductive polymer 12, for example. Support 10 may include more than or equal to 1 mass % and less than or equal to 10 mass % of ion-conductive polymer 12, for example. Ion-conductive polymer 12 coats the outer surface of carbon particle 11. Accordingly, the charging and discharging reversibility is expected to be improved. This is presumably because the nucleation of first metal 21 is suppressed at the outer surface of carbon particle 11. That is, this is presumably because the nucleation of first metal 21 occurs more selectively within the open pores.

Ion-conductive polymer 12 may coat the entire outer surface of carbon particle 11. Due to the ion conductivity thereof, it is considered that the ions of the first metal can be diffused into carbon particle 11 even when the entire outer surface of carbon particle 11 is coated therewith. Ion-conductive polymer 12 may partially coat the outer surface of carbon particle 11. Also when ion-conductive polymer 12 partially coats the outer surface, it is considered that the nucleation at the outer surface is suppressed. Therefore, it is considered that ion-conductive polymer 12 may coat at least a portion of the outer surface of carbon particle 11.

Ion-conductive polymer 12 should not be limited particularly as long as ion-conductive polymer 12 is a polymer that conducts the ions of first metal 21. Examples of ion-conductive polymer 12 may include polyethylene oxide (PEO), polyvinyl alcohol (PVA), Nafion®, vinylidene fluoride-hexafluoropropene copolymer (PVDF-HFP), polyacrylic acid (PAA), polymethyl methacrylate (PMMA), and the like. One type of ion-conductive polymer 12 may be used solely. Two or more types of ion-conductive polymers 12 may be used in combination.

(Binder)

Support layer 202 may further include a binder, for example. For example, support layer 202 may include more than or equal to 90 mass % and less than or equal to 99 mass % of support 10 and a remainder of the binder. The binder binds supports 10 to each other. Furthermore, the binder binds support layer 202 and negative electrode collector 201 to each other.

The binder should not be limited in particular. Examples of the binder may include carboxymethylcellulose (CMC), styrene-butadiene rubber (SBR), polyvinylidene difluoride (PVDF), polytetrafluoroethylene (PTFE), polyimide (PI), polyamidoimide (PAI), and the like. One type of binder may be used solely. Two or more types of binders may be used in combination.

<<Positive Electrode>>

Positive electrode 100 may be a sheet. Positive electrode 100 includes a positive electrode collector 101 and an active material layer 102, for example. Positive electrode collector 101 may be an Al foil, an Al alloy foil, or the like, for example. Positive electrode collector 101 may have a thickness of more than or equal to 10 μm and less than or equal to 50 μm, for example.

An active material layer 102 is formed on a surface of positive electrode collector 101. Active material layer 102 may be formed on each of the front and backside surfaces of positive electrode collector 101. Active material layer 102 may have a thickness of more than or equal to 10 μm and less than or equal to 200 μm, for example. Active material layer 102 at least includes a positive electrode active material. That is, positive electrode 100 at least includes the positive electrode active material.

The positive electrode active material is a material in which the ions of first metal 21 can be reversibly intercalated. When first metal 21 is Li, the positive electrode active material may be $LiCoO_2$, $LiNiO_2$, $LiMnO_2$, $LiMn_2O_4$, $Li(Ni_{1/3}Co_{1/3}Mn_{1/3})O_2$, $LiFePO_4$, or the like, for example. When first metal 21 is Na, the positive electrode active material may be $NaCoO_2$, $NaFeO_2$, or the like, for example. One type of positive electrode active material may be used solely. Two or more types of positive electrode active materials may be used in combination.

Active material layer 102 may further include a conductive material and a binder. Active material layer 102 may include more than or equal to 80 mass % and less than or equal to 98 mass % of the positive electrode active material, more than or equal to 1 mass % and less than or equal to 10 mass % of the conductive material, and a remainder of the binder, for example. The conductive material should not be limited in particular. The conductive material may be carbon black, graphite, carbon fiber, or the like, for example. The binder should not be also limited in particular. The binder may be PVDF or the like, for example.

<<Electrolyte>>

The electrolyte is a material in which the ions of first metal 21 can be conducted. The electrolyte may be a liquid electrolyte. The electrolyte may be a gel electrolyte. The electrolyte may be a solid electrolyte. The liquid electrolyte may be an electrolyte solution, an ionic liquid, or the like, for example. The electrolyte solution includes a supporting salt and a solvent. When first metal 21 is Li, the supporting salt may be $LiPF_6$, $LiBF_4$, $LiN(SO_2F)_2$, or the like, for example. When the first metal is Na, the supporting salt may be $NaClO_4$ or the like, for example. The electrolyte solution may include more than or equal to 0.5 mol/l and less than or equal to 2 mol/l of the supporting salt, for example. The electrolyte solution may include more than or equal to 3 mol/l and less than or equal to 5 mol/l of the supporting salt, for example.

Examples of the solvent may include ethylene carbonate (EC), propylene carbonate (PC), dimethyl carbonate (DMC), ethyl methyl carbonate (EMC), diethyl carbonate (DEC), acetonitrile (AN), N,N-dimethylformamide (DMF), 1,2-dimethoxy ethane (DME), dimethyl sulfoxide (DMSO), and the like. One type of solvent may be used solely. Two or more types of solvents may be used in combination.

<<Separator>>

Separator 300 may be a film. Separator 300 may have a thickness of more than or equal to 10 µm and less than or equal to 50 µm, for example. Separator 300 is porous. Separator 300 is electrically insulative. Separators 300 may be a porous film composed of polyethylene (PE), polypropylene (PP) or the like, for example.

Separator 300 may have a single-layer structure. Separator 300 may be formed only of a porous film composed of PE, for example. Separator 300 may have a multilayer structure. Separator 300 may be formed by layering a porous film composed of PP, a porous film composed of PE and a porous film composed of PP in this order, for example.

<Method of Manufacturing Metal Negative Electrode Secondary Battery>

The metal negative electrode secondary battery of the present embodiment can be manufactured by the following manufacturing method, for example.

Figure 4:
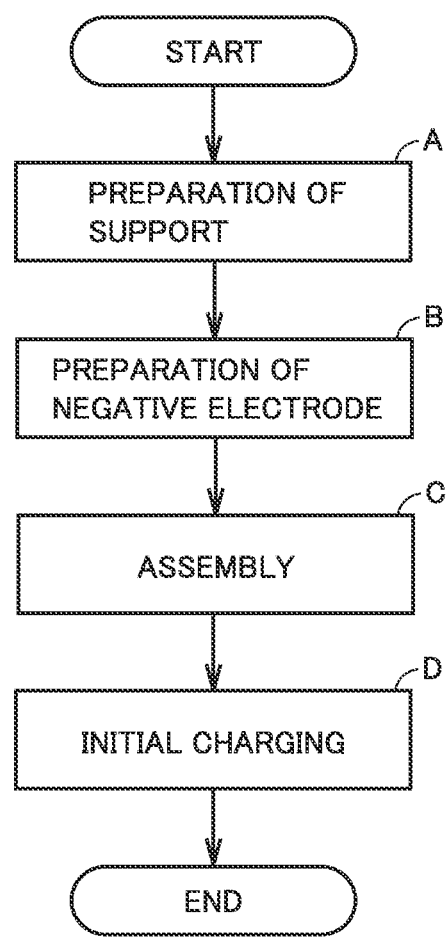
FIG. 4 is a flowchart schematically showing a method of manufacturing the metal negative electrode secondary battery in the present embodiment.

FIG. 4 is a flowchart schematically showing a method of manufacturing the metal negative electrode secondary battery in the present embodiment. The manufacturing method in the present embodiment at least includes "(A) Preparation of Support", "(B) Preparation of Negative Electrode", "(C) Assembly", and "(D) Initial Charging".

<<(A) Preparation of Support>>

The manufacturing method of the present embodiment includes preparing support 10.

Support 10 at least includes carbon particle 11. Support 10 may be purchased. For example, "CNovel®" provided by Toyo Tanso may be prepared as support 10. "CNovel®" is a carbon particle 11 provided with a plurality of open pores. Second metal 22 can be adhered to the inner walls of the open pores in the following manner, for example.

Nano particles of second metal 22 are prepared. The nano particles are dispersed in a predetermined solvent. Accordingly, a fluid dispersion is produced. Carbon particles 11 are further dispersed in the fluid dispersion. The fluid dispersion is filtered. Accordingly, carbon particles 11 are collected. Carbon particles 11 are cleaned. Accordingly, the nano particles of second metal 22 can be adhered to the open pores. As described above, first metal 21 may be Li. Second metal 22 may be Mg. Mg is a metal to be alloyed with Li.

Figure 5:
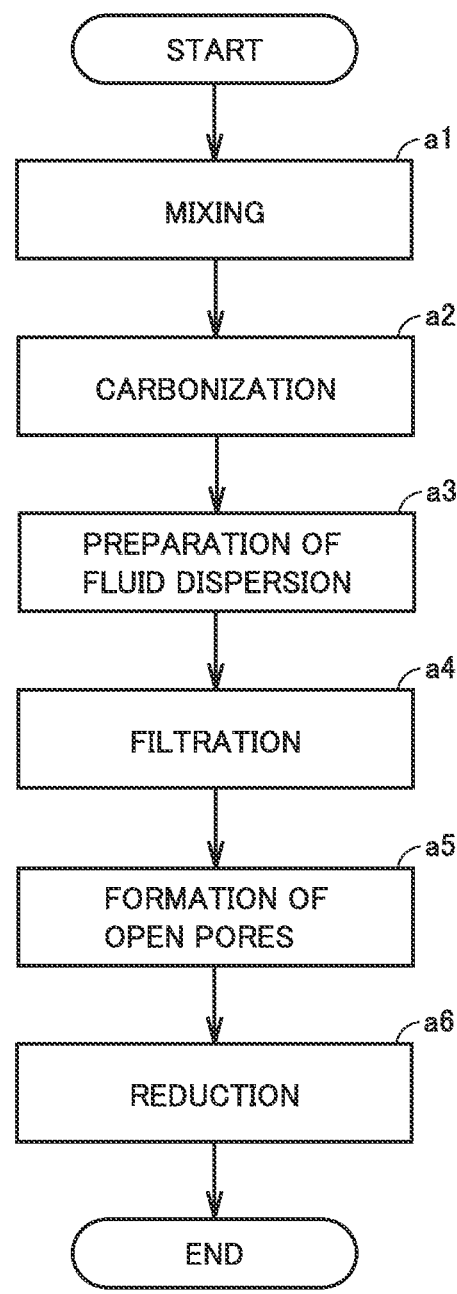
FIG. 5 is a flowchart showing an exemplary method of manufacturing the support in the present embodiment.

Support 10 may be produced. For example, support 10 may be produced using a template method. FIG. 5 is a flowchart showing an exemplary method of manufacturing the support in the present embodiment. The method of manufacturing the support in the present embodiment may include "(a1) Mixing", "(a2) Carbonization", "(a5) Formation of Open Pores", and "(a6) Reduction", for example. The method of manufacturing the support in the present embodiment may further include "(a3) Preparation of Fluid Dispersion" and "(a4) Filtration". That is, the method of manufacturing the battery in the present embodiment may further include these.

<<(a1) Mixing>>

The method of manufacturing the support in the present embodiment may include producing a mixture by mixing a resin material and metal oxide particles. The resin material is a precursor of the carbon particle. The metal oxide particles serve as a template for the open pores.

The resin material desirably has flowability. The resin material may be powder. The resin material may be liquid. The resin material may be tar, pitch, polyamic acid, polyvinyl alcohol, or the like, for example. Each of the metal oxide particles may be an oxide of second metal 22. In this case, the metal oxide particle can serve as a template for the open pores and can be also a precursor of second metal 22. When second metal 22 is, for example, Mg, the metal oxide particle may be MgO, for example. The size of the pore of carbon particle 11 may be adjusted in accordance with the size of the metal oxide particle, for example. The metal oxide particle may have a particle size of more than or equal to 1 nm and less than or equal to 200 nm, for example. The whole pore volume or the like of carbon particle 11 can be adjusted in accordance with a mixing ratio of the resin material and the metal oxide particles, for example. For example, the mixing ratio may be as follows in the mass ratio: "resin material:metal oxide particles=99:1 to 80:10".

<<(a2) Carbonization>>

The method of manufacturing the support in the present embodiment may include producing carbon particle 11 in which the plurality of metal oxide particles are dispersed, by heating the mixture in a non-oxidizing atmosphere.

The non-oxidizing atmosphere may be a nitrogen atmosphere or the like, for example. The heating temperature may be more than or equal to 700° C. and less than or equal to 2000° C., for example. Accordingly, the resin material can be carbonized to form carbon particle 11. It is considered that the plurality of metal oxide particles are dispersed in carbon particle 11. The BET specific surface area of carbon particle 11 can be adjusted in accordance with the heating temperature, heating time, or the like in the carbonization, for example.

<<(a3) Production of Fluid Dispersion>>

The method of manufacturing the support in the present embodiment may include producing a fluid dispersion by dispersing carbon particles 11 in a solution of ion-conductive polymer 12. Details of ion-conductive polymer 12 are as described above. For example, a solution of PVDF-HFP or the like can be produced. A solvent of this solution may be N-methyl-2-pyrrolidone (NMP) or the like, for example.

<<(a4) Filtration>>

The method of manufacturing the support in the present embodiment may include producing carbon particle 11 having the outer surface coated with ion-conductive polymer 12, by filtering the fluid dispersion. After the filtration, an operation such as cleaning may be appropriately performed.

<<(a5) Formation of Open Pores>>

The method of manufacturing the support in the present embodiment may include forming a plurality of open pores in carbon particle 11 by removing part of the metal oxide particles from carbon particle 11. It should be noted that after "(a2) Carbonization", "(a5) Formation of Open Pores" may be performed without performing "(a3) Production of Fluid Dispersion" and "(a4) Filtration".

For example, carbon particle 11 is cleaned by an inorganic acid. Accordingly, the metal oxide particles can be eluted from carbon particle 11. The inorganic acid may be hydrochloric acid, sulfuric acid, nitric acid, or the like, for example. An amount of elution of the metal oxide particles can be adjusted in accordance with a concentration of the inorganic acid, cleaning time, and the like, for example. The metal oxide particles remaining after the cleaning will be second metal 22. With the cleaning, substantially all the metal oxide particles may be removed. In this case, carbon particle 11 including substantially no second metal 22 can be produced.

Then, by heating carbon particle 11, at least a portion of the pore wall may be graphitized. The heating temperature may be more than or equal to 2000° C. and less than or equal to 3000° C., for example. An atmosphere during the heating may be argon atmosphere or the like, for example.

<<(a6) Reduction>>

The method of manufacturing the support in the present embodiment may include generating second metal 22 by reducing the metal oxide particles remaining in the open pores. Generated second metal 22 is adhered to the inner walls of the open pores. For example, the metal oxide particles may be reduced by a predetermined reducing agent. Alternatively, "(D) Initial Charging" described below can also serve as "(a6) Reduction". That is, as a result of initial charging, the metal oxide particles remaining in the open pores may be reduced to generate second metal 22.

<<(B) Preparation of Negative Electrode>>

The method of manufacturing the battery in the present embodiment includes preparing negative electrode 200 at least including support 10. For example, a slurry can be produced by mixing support 10, a binder, and a solvent. The slurry can be applied to the surface of negative electrode collector 201 and can be dried, thereby forming support layer 202. Accordingly, negative electrode 200 can be prepared. Further, negative electrode 200 may be rolled, cut, and the like in accordance with the specification of battery 1000.

<<(C) Assembly>>

The method of manufacturing the battery in the present embodiment includes assembling battery 1000 at least including positive electrode 100, negative electrode 200, and the electrolyte.

For example, positive electrode 100 and separator 300 are prepared. Details of positive electrode 100 and separator 300 are as described above. Electrode group 400 can be formed by alternately stacking positive electrode 100 and negative electrode 200 with separator 300 being interposed between positive electrode 100 and negative electrode 200.

Case 500 and the electrolyte are prepared. Details of case 500 and the electrolyte are as described above. Electrode group 400 and the electrolyte are stored in case 500. Case 500 is sealed. In this way, battery 1000 is assembled.

<<(D) Initial Charging>>

The method of manufacturing the battery in the present embodiment includes charging battery 1000. Battery 1000 is charged to a deposition potential of first metal 21. Accordingly, first metal 21 is held in the open pores of support 10. For example, when first metal 21 is Li, battery 1000 may be charged to 4.2 V. A current density during the charging should not be limited in particular. For example, the current density may be a current density corresponding to about 1/10 C. "1 C" represents a current rate at which a rated capacity of battery 1000 is charged in 1 hour. The current density may be about 1 mA/cm², for example.

After the charging, battery 1000 may be discharged. For example, when first metal 21 is Li, battery 1000 may be discharged to 3.0 V. In this way, battery 1000 can be manufactured.

EXAMPLES

Hereinafter, Examples of the present disclosure will be described. However, the description below is not intended to limit the scope of claims.

Example 1

<<(A) Preparation of Support>>

The following material was prepared.
Support: "CNovel®" provided by Toyo Tanso with a BET specific surface area of 50 m²/g and a whole pore volume of 2 ml/g <<(B) Preparation of Negative Electrode>>

The following materials were prepared.
Binder: CMC and SBR
Solvent: water
Negative electrode collector: Cu foil A slurry was produced by mixing the support, the binder, and the solvent. This slurry was applied onto a surface of the negative electrode collector and was dried, thereby forming the support layer. This support layer has a weight of 5 mg/cm². In this way, the negative electrode was prepared.

<<(C) Assembly>>

The following materials were prepared.
Positive electrode active material: $Li(Ni_{1/3}CO_{1/3}Mn_{1/3})O_2$
Conductive material: carbon black
Binder: PVDF
Solvent: NMP
Positive electrode collector: Al foil A slurry was produced by mixing the positive electrode active material, the conductive material, the binder, and the solvent. This slurry was applied onto a surface of the positive electrode collector and was dried, thereby forming an active material layer. The active material layer has a weight of 16 mg/cm². In this way, the positive electrode was prepared.

The following material was prepared.
Separator: porous film composed of PE (single-layer structure; thickness of 20 μm)

The positive electrode, the separator, and the negative electrode were stacked such that the positive electrode and the negative electrode faced each other with the separator being interposed therebetween. Accordingly, an electrode group was formed. A predetermined case was prepared. The electrode group was stored in this case. An electrolyte (electrolyte solution) having the following composition was prepared.
Supporting salt: $LiPF_6$ (1 mol/l)
Solvent: [EC:DMC:EMC=3:4:3 (volume ratio)]

The electrolyte was stored in the case. The case was sealed. In this way, the battery was assembled. The battery at least includes the positive electrode, the negative electrode, and the electrolyte.

<<(D) Initial Charging>>

The battery was charged to 4.2 V. Accordingly, the first metal (Li) was held in the open pores of the carbon particles. Then, the battery was discharged to 3.0 V. In this way, the battery was manufactured.

Example 2

<<(a1) Mixing>>

The following materials were prepared.
Resin material: aqueous polyvinyl alcohol solution
Metal oxide particles: MgO A mixture was produced by mixing the resin material and the metal oxide particles.

<<(a2) Carbonization>>

The carbon particles were prepared by heating the mixture in a nitrogen atmosphere. It is considered that a plurality of metal oxide particles are dispersed in each of the carbon particles.

<<(a5) Formation of Open Pores>>

The carbon particle was cleaned in hydrochloric acid. The cleaning was performed to remove part of the metal oxide particles from the carbon particle. Accordingly, a plurality of open pores were formed in the carbon particle. In this way, the support was prepared. Except for these, the battery was assembled in the same manner as in Example 1.

<<(a6) Reduction (Initial Charging)>>

The battery was charged to 4.2 V. On this occasion, the metal oxide particles (MgO) remaining in the open pores of the carbon particle were reduced to generate the second metal (Mg). It is considered that the second metal is adhered to the inner walls of the open pores. Then, the battery was discharged to 3.0 V. In this way, the battery was manufactured.

Example 3

<<(a3) Production of Fluid Dispersion>>

The process until "(a2) Carbonization" was performed in the same manner as in Example 2, thereby producing carbon particles. A solution of an ion-conductive polymer (PVDF-HFP) was prepared. A solvent of the solution is NMP. It is considered that the ion-conductive polymer has a mass average molecular mass of more than or equal to 1,000,000. A fluid dispersion was prepared by dispersing the carbon particles in the solution of the ion-conductive polymer.

<<(a4) Filtration>>

The carbon particles were collected by filtering the fluid dispersion. The outer surface of each of the carbon particles was coated with the ion-conductive polymer. Then, the process after "(a5) Formation of Open Pores" was performed in the same manner as in Example 2, thereby manufacturing a battery.

Example 4

A support was produced in the same manner as in Example 2 except that heating temperature and the like in "(a2) Carbonization" were changed, thereby manufacturing a battery. In Example 4, the support has a BET specific surface area of 500 m²/g.

Comparative Example 1

In Comparative Example 1, a negative electrode formed only of a negative electrode collector (Cu foil) was used. Except for this, a battery was manufactured in the same manner as in Example 1.

Comparative Example 2

A thin film of the second metal (Mg) was formed on a surface of the negative electrode collector (Cu foil) through sputtering. Except for this, a battery was manufactured in the same manner as in Comparative Example 1.

<Evaluation>

In 25° C. environment, ten cycles of charging and discharging were performed under conditions described below. A capacity retention was calculated by dividing the discharging capacity in the tenth cycle by the discharging capacity in the first cycle. Results are shown in Table 1 below. As the capacity retention is higher, it is considered that the charging and discharging reversibility is improved.

Charging: constant current mode; charging voltage of 4.2 V; current density of 1 mA/cm²

Discharging: constant current mode; discharging voltage of 3.0 V; current density of 1 mA/cm²

TABLE 1

List of Examples and Comparative Examples

| | Negative Electrode | | | | | Evaluation |
|---|---|---|---|---|---|---|
| | Negative Electrode Active Material First Metal | Support BET Specific Surface Area [m²/g] | Second Metal | Ion-Conductive Polymer | Collector | Capacity Retention [%] |
| Example 1 | Li | 50 | None | None | Cu Foil | 58 |
| Example 2 | Li | 50 | Mg | None | Cu Foil | 90 |
| Example 3 | Li | 50 | Mg | PVdF-HFP | Cu Foil | 94 |
| Example 4 | Li | 500 | Mg | None | Cu Foil | 59 |
| Comparative Example 1 | Li | No Support | None | None | Cu Foil | 45 |
| Comparative Example 2 | Li | No Support | Mg* | None | Cu Foil | 48 |

*A Mg thin film was formed on a surface of a Cu foil through sputtering.

<Results>

As shown in Table 1 above, it is recognized that when the carbon particle provided with the plurality of open pores is used as a support, the charging and discharging reversibility tends to be improved. This is presumably because the nucleation of the first metal (Li) is likely to occur uniformly and the form of deposition of the first metal is also likely to be uniform.

Further, it is recognized that since the second metal (Mg) is adhered to the inner walls of the open pores, the charging and discharging reversibility tends to be improved significantly. This is presumably because the nucleation of the first metal is likely to occur selectively within the open pores and the nucleation overpotential is decreased.

It is recognized that since the outer surface of the carbon particle is coated with the ion-conductive polymer, the charging and discharging reversibility tends to be improved. This is presumably because the nucleation at the outer surface of the carbon particle is suppressed.

The capacity retention in Example 4 is lower than that in Example 2. This is presumably because the large BET specific surface area facilitates the side reaction (such as reduction and decomposition of the electrolyte).

The capacity retentions in Comparative Examples 1 and 2 are low. This is presumably because Li grows to have a dendrite structure and a lot of Li is deactivated due to a side reaction between the Li and the electrolyte.

The embodiments and examples disclosed herein are illustrative and non-restrictive in any respect. The technical scope indicated by the claims is intended to include any modifications within the scope and meaning equivalent to the terms of the claims.

What is claimed is:

1. A metal negative electrode secondary battery at least comprising a positive electrode, a negative electrode, and an electrolyte,
   the negative electrode at least including a support and a first metal,
   the support at least including a carbon particle, the carbon particle having a BET specific surface area of less than or equal to 50 $m^2/g$,
   the carbon particle being provided with a plurality of open pores,
   the first metal being held in the open pores,
   the first metal being an alkali metal or an alkaline earth metal,
   the negative electrode being configured to exchange an electron through dissolution reaction and deposition reaction of the first metal.

2. The metal negative electrode secondary battery according to claim 1, wherein
   the support further includes a second metal,
   the second metal is a metal to be alloyed with the first metal, and
   the second metal is adhered to inner walls of the open pores.

3. The metal negative electrode secondary battery according to claim 2, wherein
   the first metal is lithium, and
   the second metal is magnesium.

4. The metal negative electrode secondary battery according to claim 1, wherein
   the support further includes an ion-conductive polymer, and
   the ion-conductive polymer coats an outer surface of the carbon particle.

5. The metal negative electrode secondary battery according to claim 4, wherein the ion-conductive polymer comprises polyethylene oxide (PEO), polyvinyl alcohol (PVA), sulfonated tetrafluoroethylene-based fluoropolymer, vinylidene fluoride-hexafluoropropene copolymer (PVDF-HFP), polyacrylic acid (PAA), polymethyl methacrylate (PMMA), or a combination thereof.

* * * * *